United States Patent [19]

Farrell et al.

[11] 3,825,679

[45] July 23, 1974

[54] FILM SCANNER

[75] Inventors: Greg Farrell, Sydney, New South Wales, Australia; Akira Tsuji; Dojun Hasimoto, both of Tokyo, Japan; Nobuhisa Koto; Nobutake Hirai, both of Kyoto, Japan

[73] Assignee: Mitsubishi Denki Kabushiki Kaisha, Tokyo, Japan

[22] Filed: Mar. 5, 1973

[21] Appl. No.: 338,182

[30] Foreign Application Priority Data

May 8, 1972 Japan ............................... 47-45676
Sept. 18, 1972 Japan ............................. 47-108231

[52] U.S. Cl. .......................... 178/7.2, 178/DIG. 28
[51] Int. Cl. ............................................ H04n 5/36
[58] Field of Search ....................... 178/DIG. 28, 7.2

[56] References Cited

FOREIGN PATENTS OR APPLICATIONS 2,062,580 6/1971 Germany ..................... 178/DIG. 28

*Primary Examiner*—Robert L. Richardson
*Attorney, Agent, or Firm*—Wenderoth, Lind & Ponack

[57] ABSTRACT

The disclosed system includes a flying-spot scanner tube selectively operative with frame frequencies of 50 and 60 hertz, and a capstan for driving a record film at the synchronous speed of an associated synchronous motor selectively supplied with 50 and 60 hertz power. Only those record films having 50 frames recorded with video information per second are provided on the leader with an aluminum piece. Upon reproducing one of these films the aluminum piece contacts a guide roller which causes the system to switch to the 50 frame mode of operation. At the end of the rewinding of the reproduced film, the aluminum piece again contacts the guide roller to return the system to the normal mode of operation in which record films with 60 frames per second can be reproduced.

5 Claims, 3 Drawing Figures

FILM SCANNER

BACKGROUND OF THE INVENTION

This invention relates to a system for optically reproducing video information from a record media traveling in a predetermined direction and past a flying-spot scanner tube. Particularly the invention is concerned with an information reproducing system for selectively reproducing from at least two species of record media having different recording frequencies associated video information by switching a single EVR(to which the "electronic video recording" is abbreviated) player from one to another of the modes of operation Record media films for use with "EVR" particularly suitable for being reproduced by the present invention are optical record films including the longitudinal band portion having video information optically recorded thereon and both side edge portions applied with respective magnetic coatings on which audio information is magnetically recorded in sound tracks in synchronization of the video information. Such optical record films have frames recorded thereon with video information at a predetermined rate. For example one species of optical record films records at a frame frequency of 60 hertz and another species thereof records information at a frame frequency of 50 hertz. If the one species of optical record films with 60 frames per second is reproduced by an EVR layer operated at 50 frames per second, the reproduced information will be different in characteristics from the recorded information. This is also true when optical record films with 50 frames per second are reproduced by an EVR player having a frame frequency of 60 hertzs. Thus the species of optical record films are determined by the EVR player available and are therefore restricted as to their applications.

SUMMARY OF THE INVENTION

Accordingly it is an object of the present invention to provide, in a system for optically reproducing video information by means of a single EVR player a new and improved means for selectively reproducing at least two different films having different recording rates automatically.

The present invention accomplishes this object by the provision of a system for optically reproducing video information comprising a record medium having video information recorded thereon, driving means for continuously moving the record medium, and a flying-spot scanner tube for scanning the record medium to reproduce the video information from the record medium characterized in that the rate of rotation of the driving means is changed to one of a plurality of preset values in accordance with a feed speed at which the record medium is being moved.

The system for optically reproducing video information may preferably include means for changing a deflecting oscillation frequency, a deflection width and a deflection rectilinearity correction for at least one of the horizontal and vertical deflection of the flying-spot scanner tube simultaneously with the change in the rate of rotation of the driving means.

In order to automatically change the system from one to the other of the modes of operation, the system may comprise advantageously a pair of deflecting circuits for the flying-spot scanner tube operative with frame frequencies of for example, 50 and 60 hertz an identifier element disposed on the starting leader portion of either one of the two species of record media sensor means for sensing the identifier element upon initiating reproduction of that record medium including the identifier element, to provide an output, a bistable multivibrator controlled by the output from the sensor means to control relay means, the bistable multivibrator and relay means being maintained in their controlled state during the reproduction of the reproducing record medium, the relay means being operated to enable that deflecting circuit having a frame frequency corresponding to the frame rate at which information was recorded on the record medium while at the same time changing the rate of rotation of the driving means to that magnitude thereof assigned to the record medium having the identifier element.

BRIEF DESCRIPTION OF THE DRAWING

The invention will become more apparent from the following detailed description taken in conjunction with the accompanying drawing in which.

DESCRIPTION OF THE PREFERRED EMBODIMENT

Figure 1:
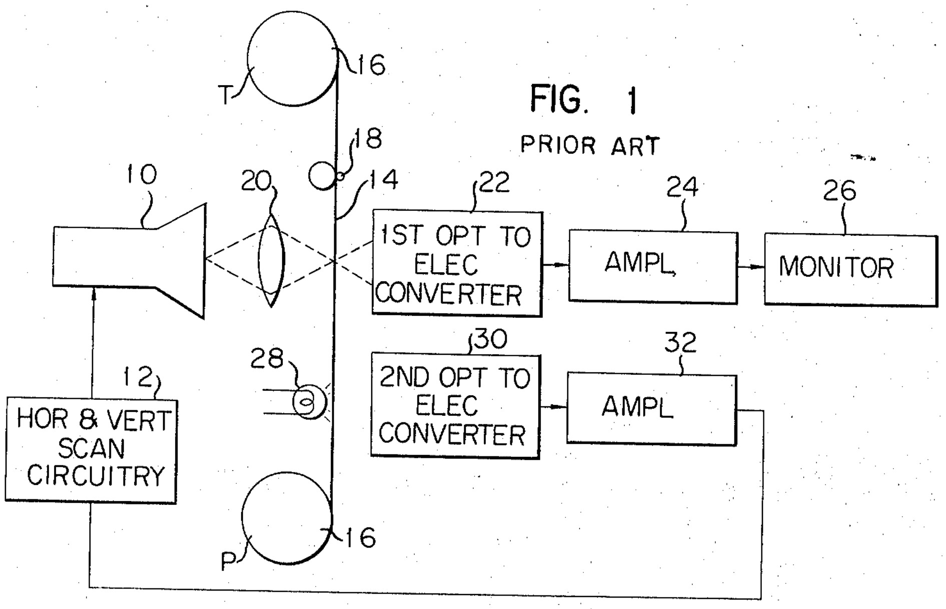
FIG. 1 PRIOR ART
FIG. 1 is a schematic block diagram of a system for optically reproducing video information in accordance with the principles of the prior art.

Referring now to FIG. 1, there is illustrated a conventional system for optically reproducing video information, called an "electronic video recording" (which is abbreviated to "EVR"). The arrangement illustrated comprises a flying-spot scanner tube 10 and horizontal and vertical scanning circuitry 12 for causing a spot on the screen of the scanner tube 10 to scan in the manner well known in the art. A record medium 14 in the form of an optical film continuously travels past the flying-spot scanner tube 10 in one direction from a feed roll $16_P$ to a take-up roll $16_T$ and at a predetermined speed fixed by a capstan 18. The record medium has video information optically recorded frame by frame thereon at a predetermined fixed rate, and audio information is magnetically recorded in sound tracks on a pair of magnetic coatings on both side edge portions of the medium in synchronization with the video information. The capstan 18 is rotated at the proper speed to maintain the predetermined fixed feed rate of the record medium 14. For example, if the record medium 14 has video information recorded thereon at a rate of 60 frames per second, then the capstan 18 continuously move the film past lens 20 at a speed 60 frames per second.

As shown in FIG. 1, lens 20 is disposed between the flying-spot scanner tube 10 and the traveling film 14 to project and focus a beam of light from the flying-spot on the screen of the scanner tube 10 upon the traveling film. Thus the flying-spot on the scanner tube 10 successively scans the traveling film 14. A first optical-to-electrical converter 22, such as a phototransistor is disposed opposite the lens 20 relative to the film 14 and detects the intensity of the beam which is transmitted through each point on the film to provide an output signal proportional to the photographic density of the film at that point. After having been amplified by an amplifier 24, the output signal from the coverter 22 is applied to a monitor 26 where it is reproduced and displayed on a display tube disposed therein and having a raster scanned in synchronization with the scanning of the film 14.

On the side of the scanner tube 10 remote from the capstan 18 a source of light 28 such as an incandescent lamp, is disposed opposite a second optical-to-electrical converter 30 which is similar to the converter 22, and the film travels therebetween. Thus, a synchronizing mark which is recorded in each frame at a predetermined position, for example at the beginning of the frame, on the film is irradiated by the source 28 and converted to a corresponding electrical signal by the converter 30. The electrical signal is then amplified by an amplifier 32 and applied to the scanning circuitry 12 to control the vertical scanning circuit portion thereof.

Audio information recorded on the film is adapted to be reproduced by any suitable audio reproduction system of conventional construction(not shown).

The film has been previously described to contain data recorded at a rate of 60 frames per second. The recorded data is best reproduced by a television system having a frame frequency of 60 hertz. For use with a television system having a frame frequency of 50 hertz, record media can be recorded with video information at a rate of 50 frames per second. This difference in the number of frames per second also causes, the audio recording speed to differ. Upon reproduction by EVR players having a rate of 60 frames per second the recording medium must be driven at a predetermined fixed speed of 15.24 cm per second, corresponding to 60 frames per second while with a 50 frames per second EVR player the recording medium should be driven at a predetermined fixed speed of 12.7 cm per second, corresponding to 50 frames per second.

If 50 frames-per-second film is reproduced by a 60 frame EVR player, the film will be driven at a speed higher than the predetermined fixed speed of 12.7 cm per second. Therefore the reproduced images will move at a speed equal to 6/5 time the predetermined fixed speed and the reproduction voices characteristics will be different from the recording characteristics. That is, the reproduced voice will become unpleasant and can not at all be put to practical use. Similarly if film, having 60 frames-per-second data is reproduced by a 50 frame EVR player, the quality of reproduced video and audio information are similarly deteriorated. Therefore, EVR players are required to use, as sources of information, record media having the number of frames per second corresponding to the frame frequency of the players. In other words, the type of film available is determined by the particular EVR player resulting in the restriction of the fields of software which can be put to practical use.

The present invention provides a system permitting, for example, a single EVR player to reproduce films having at least two recording rates automatically with the number of frames per second, as determined by the reproducing film.

Figure 2:
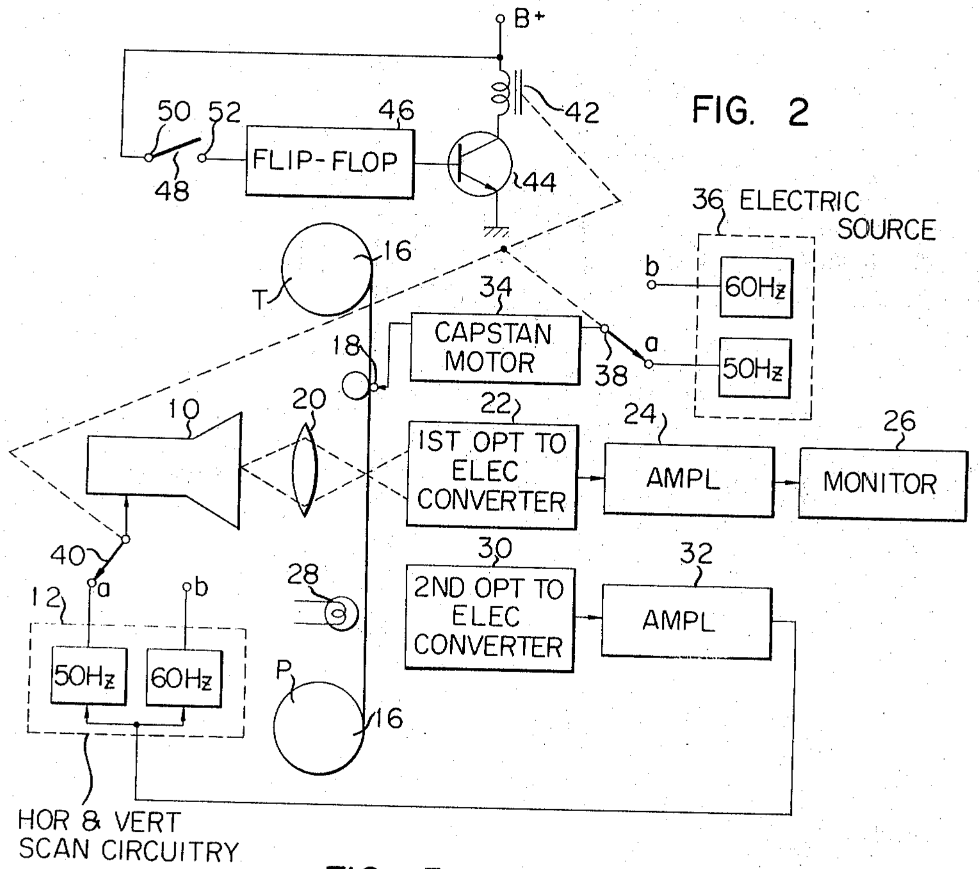
FIG. 2 is a view similar to FIG. 1 but illustrating the present invention.

Referring now to FIG. 2, wherein like reference numerals designate components corresponding to those shown in FIG. 1, it is seen that the arrangement comprises a capstan motor 34 connected to a source of electric power 36 via a transfer switch 38 to drive the film 14 through the capstan 18. The source 36 includes a pair of power sections for providing 50 and 60 hertz powers respectively and the motor 34 is preferably a synchronous motor adapted to rotate at a rate in accordance with the frequency provided by the source 36, to thereby drive the film 14 at a predetermined fixed speed. In FIG. 2, the transfer switch 38 is shown as having a transfer contact engaged by a stationary contact *a* to cause the source 36 to supply a 50 hertz power to the motor 34. Alternatively, when the transfer switch 38 engages stationary contact *b*, the source 36 supplies a 60 hertz power to the motor 34.

The horizontal and vertical scanning circuitry 12 includes a vertical scanning circuit having a pair of sections labelled "50 Hz" and "60 Hz". Both sections are adapted to scan at different frequencies corresponding to 50 and 60 hertzs frame frequencies respectively and to provide vertical raster widths on the flying-spot scanner tube 10 and vertical rectilinearity corrections conforming to 50 and 60 hertz frame frequencies respectively. Both vertical scanning sections of the scanning circuitry 12 are selectively connected to the flying-spot scanner tube 10 through another transfer switch 40. In FIG. 2, the transfer switch 40 is shown as having a transfer contact engaged by a stationary contact *a* to put the scanner tube 10 in the 50 frame mode of operation. If the switch 40 has the transfer contact engaged by another stationary contact *b* then the scanner tube 10 is put in the 60 hertz mode of operation.

As shown at the dotted line in FIG. 2, the transfer switches 38 and 40 are simultaneously controlled by a control relay 42. The relay 42 includes an operating winding connected at one end to a positive voltage B+ and at the other end to a collector electrode of a transistor 44. The transistor 44 includes an emitter electrode connected to ground and a base electrode connected to an output of a FLIP-FLOP 46 formed of a bistable multivibrator. The Flip-Flop 46 has an input connected to the one end of the relay 42 winding through a switch including a movable arm 48 and a pair of contacts 50 and 52 as will be described in detail hereinafter.

In other respects, the arrangement is identical to that shown in FIG. 1.

Figure 3:
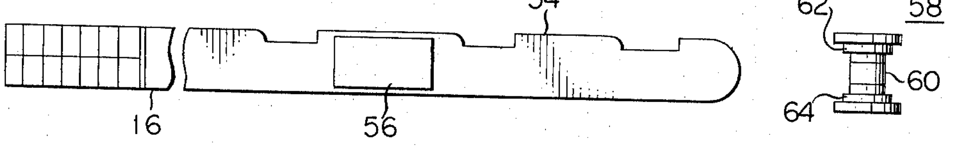
FIG. 3 is a schematic view illustrating the manner in which one species of record medium is identified in accordance with the principles of the invention.

In order to electrically identify film having data recorded at a specific rate, one of them, in the example illustrated, the 50 frame film is provided on a starting leader portion 54 thereof with an identifier element 56 as shown in FIG. 3. The identifier element 56 may be preferably formed of a foil of any suitable electrically conductive material such as aluminum and is attached to the leader portion 54 of the film 14. The other film, in this case containing 60 frame-per-second data has no identifier provided on the starting leader portion thereof.

When the film 14 begins to travel from the feed roll $16_P$ toward the take up roll $16_T$, the leader portion 54 thereof is arranged to pass over a guide roller having a special construction as shown in FIG. 3 with the aluminum foil 56 contacting the roller. The guide roller is located along the path of the film media at any suitable position, for example, between the feed roll $16_P$ and the source of light 28 or between the capstan 18 and the take up roll $16_T$, although it is not shown in FIG. 2. As shown in FIG. 3, the guide roller, generally designated by the reference numeral 58, includes a central portion 60 formed of any suitable electrically insulating material for example "bakelite" (trade mark) and stepped end portions 62 and 64 of any suitable electrically conductive material such as stainless steel and sandwiching the insulating portion 60 therebetween. The conductive portion 62 is adapted to be applied with a positive voltage B+.

As above described, the starting leader portion 54 of the film 14 as shown in FIG. 3, passes over the guide roller 58 to contact the aluminum foil 56 with the guide roller 58. At that time, the aluminum foil 56 short circuits both conductive roller portions 62 and 64 with each other. This causes the voltage B+ at the conductive portion 62 to be transferred to the conductive portion 64 through the aluminum foil 56 resulting in the formation of a stepped voltage in the form of a pulse on the conductive portion 64. Thus the foil 56 forms a switch along with the conductive portions 62 and 64. That switch is shown in FIG. 2 as being the switch 48–50–52; the aluminum foil 56 serving as the movable arm 48 and the conductive portions 62 and 64 providing the stationary contacts 50 and 52 respectively.

Referring back to FIG. 2, the stepped voltage developed at the contact 42 corresponding to the conductive roller portion 62 is applied to trigger the Flip-Flop bistable multivibrator 46 from one to the other of two stable states whereby the transistor changes its conductive state. The Flip-Flop 46 is maintained in the other state until the succeeding pulse is applied thereto. Assuming that the transistor 44 is responsive to the Flip-Flop 46 and is switched to its conductive state the relay 42 to becomes energized. It is also assumed that, when energized, the relay 42 puts the transfer contacts 38 and 40 in engagement with the respective stationary contacts*a* as shown in FIG. 2.

Under these circumstances, the 50 hertz section of the source 36 supplies 50 hertz power to the synchronous motor 34 to rotate it at its synchronous speed corresponding to the 50 hertz frequency. Therefore the motor 34 causes the capstan 18 to drive the film 14 at a fixed speed corresponding to 50 frames per second at which rate the record medium has been recorded.

On the other hand, the flying-spot scanner tube 10 has its vertical deflection unit (not shown) controlled by the 50 hertz section of the scanning circuitry 12 and synchronized with synchronizing signals from the amplifier 32 due to the synchronizing mark in each frame on the traveling record medium 14. Thus the video information on the record medium 14 is reproduced at its recording rate of 50 frames per second while at the same time the associated audio information on the proper record medium is reproduced at the same rate. This results in the faithful reproduction of the characteristics of the video and audio information which have been originally recorded on the record medium.

After the record medium 14 has been completely reproduced it can be rewound in the manner well known in the art. As the rewinding operation nears completion, the aluminum foil 56 on the starting leader portion of the record medium 14 passes over the guide roller 58 to again produce a stepped voltage on the roller portion 64 or the contact 52 as upon the initiation of the reproducing operation. The stepped voltage is applied to the Flip-Flop 46 to trigger it to the original state to turn "OFF" the transistor 44. Therefore the relay 42 is deenergized and returns the movable contacts back to the respective stationary contacts *b*. At that time the system is ready for playing a 60 frames-per second film.

As above described, the 60 frame type film is not provided on the starting leader portion with identifier means. Therefore, the relay 42 remains in its deenergized state in which the movable contacts are in engagement with the contacts *b* respectively to put the system in the 60 frame mode of operation. This means that the 60 frame record medium is reproduced at its predetermined rate of 60 frames per second.

In the arrangement of FIG. 2, it has been assumed that the flying-spot scanner tube has its horizontal deflecting frequency fixed regardless of whether it is operated in the 60 and 50 frame mode. Strictly, speaking the horizontal deflecting frequency should be 15.625 hertz in the 50 frame mode and of 15.750 hertz in the 60 frame mode. For practical purposes it is not required to change the horizontal deflecting frequency between these two modes of operation because the system are satisfactorily operative within tolerable limits concerning the characteristics of reproduced images. It it is desired to render the frame frequency more precise, the changing of the source of electric power and vertical deflection section for the flying-spot scanner tube from 50 frames-per-second to 60 frame second and vice versa may be accompanied by the use of a horizontal deflecting frequency equal to 15.625 hertz in the 50 frame mode and equal to 15.750 hertz in the 60 frame mode of operation.

From the foregoing it will be appreciated that the object of the present invention has been accomplished by the provision of means for identifying film having video information recorded at the 50 frame rate and means responsive to that identification to bring the system, normally operative in the 60 frame mode, into the 50 frame mode of operation.

While the present invention has been illustrated and described in conjunction with a single preferred embodiment it is to be understood that various changes and modifications may be resorted to without departing from the spirit and scope of the invention. For example, the aluminum foil 56 may be applied to the 60 frame record media instead of the 50 frame species thereof and the system is then normally operative in the 50 frame mode. Also the guide roller 58 may be replaced by any suitable optical-to-electrical conversion element adapted to receive a beam of light reflected from the aluminum foil 56. Further only one of the types of data bearing record media map include a starting leader portion provided with a hole or holes for the purpose of utilizing a beam of light transmitted therethrough. Also for the same purpose, one of the types of film may have the starting leader portion formed of any suitable transparent material and the starting leader portion of the other species thereof maybe formed of any suitable opaque material. In addition, it will be understood that the frame frequency is not restricted to the values above specified and they may be of any desired values. Also it will be appreciated that the present invention is equally applicable to more than two types of record media different frame frequencies. number of frames recorded with video information per unit.

What we claim is:

1. A system for optically reproducing video information from film having video information recorded therein comprising:

driving means for continuously moving said film, in operative engagement with said film, said driving means being selectively operatable at at least two predetermined speeds;

a flying-spot scanner tube means positioned opposite said moving film for scanning said film and causing the video information contained therein to be reproduced; and means connected to said driving means for changing the speed of said driving means in accordance with the rate at which video information was recorded on said film.

2. The system of claim 1, wherein said flying spot scanner tube means includes horizontal and vertical deflection means and a deflection rectilinearity correction means, all connected to said flying spot scanner tube and further comprises means operatively connected to said deflection means and said correction means for changing at least one of said deflection means and said correction means simultaneously with the changing of the speed of said driving means for adjusting said scanner tube to reproduce video information from a film at the rate said information was recorded thereon.

3. A system for optically reproducing video information from at least two films having leader portions, upon which video information was recorded at different rates, comprising:

driving means contacting the film to be reproduced for continuously moving the film, said driving means having at least two predetermined fixed rates of rotation whereby said films may be driven at a speed corresponding to the rate at which information was recorded thereon;

a flying-spot scanner tube means positioned opposite said moving film for scanning said film to reproduce video information therefrom, said flying-spot scanner tube means comprised of a deflection circuit respectively set to scan each of said at least two films;

an identifier means disposed on one of said at least two films on the leader portion thereof;

detector means operatively positioned for detecting said identifier means as the reproducing operation is initiated and for producing an identification signal indicative thereof;

means coupled to said detector means and responsive to said identification signal and coupled to said driving means and said flying spot scanner tube means for changing the rate of rotation of said driving means and said deflection circuit to correspond to the moving film for properly reproducing the video information, said changing means being maintained in a responsive state during the reproduction of said video information.

4. A system for optically reproducing video information from at least two optical record films each having leader portions and having video information recorded thereonwith 50 and 60 frames of information per second respectively, and each having one synchronizing mark recorded in each frame, comprising: capstan means positioned for moving film at a predetermined fixed speed; electric motor means for driving said capstan means and connected thereto; a source of electric power connected to said motor for selectively supplying 50 and 60 hertz power to said electric motor means; a flying-spot scanner tube positioned opposite the moving film for projecting a beam of light due to the flying-spot upon the moving optical record film; first optical-to-electrical converter means positioned on the opposite side of said film from said scanner tube for detecting the intensity of the light beam transmitted through said optical record film and converting it to a corresponding electrical signal; monitor means connected to said first converter means for reproducing said electrical signal from said first optical-to-electrical converter means to display the video information recorded on the optical record film; a source of light and second optical-to-electrical converter means respectively positioned on opposite sides of the moving film to detect said synchronizing marks in the frames on the moving optical record film to convert the synchronizing marks to electrical synchronizing signals; horizontal and vertical scanning circuit means connected to said second converter and said flying-spot scanner tube and responsive to the synchronizing signals from said second optical-to-electrical converter means for producing scanning signals for video information recorded at 50 and 60 frames per second; and switching means connected between said source of electric power and said motor and between said horizontal and vertical scanning means and said second converter and having one position in which the system is adapted to reproduce video information recorded at 50 frames-per-second and a second position in which the system is adapted to reproduce video information recorded at 60 frames-per-second, the arrangement being such that, with said switching means in the one position said source of electric power supplies 50 hertz power to said capstan motor while said horizontal and vertical scanning circuit means supplies scanning signals corresponding to video information at 50 frames per second to said flying-spot scanner tube and with said switching means in the second position, said source of electric power supplies 60 hertz power to said capstan motor while said horizontal and vertical scanning circuit means supplies scanning signals corresponding to video information at 60 frames per second to said flying-spot scanner tube.

5. A system as claimed in claim 4, wherein said switching means includes a metallic identifier element disposed on the starting leader portion of either of 50 and 60 frame per second optical record films and a guide roller positioned to engage said optical record film, said guide roller having a central portion of electrically insulating material sandwiched between side end portions of electrically conductive material, said identifier element engaged by said guide roller bridging said side end portions.

* * * * *